United States Patent
Shiau et al.

(10) Patent No.: US 11,487,056 B2
(45) Date of Patent: Nov. 1, 2022

(54) LIGHT GUIDE PLATE AND BACKLIGHT MODULE USING THE SAME

(71) Applicant: Coretronic Corporation, Hsin-Chu (TW)

(72) Inventors: Tzeng-Ke Shiau, Hsin-Chu (TW); Shih-Wei Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/347,611

(22) Filed: Jun. 15, 2021

(65) Prior Publication Data

US 2021/0396924 A1 Dec. 23, 2021

(30) Foreign Application Priority Data

Jun. 22, 2020 (CN) .................. 202021164623.X

(51) Int. Cl.
*F21V 8/00* (2006.01)

(52) U.S. Cl.
CPC ......... *G02B 6/0036* (2013.01); *G02B 6/0038* (2013.01); *G02B 6/0055* (2013.01)

(58) Field of Classification Search
CPC ... G02B 6/0036; G02B 6/0038; G02B 6/0055
See application file for complete search history.

(56) References Cited

U.S. PATENT DOCUMENTS

| 7,796,212 B2* | 9/2010 | Hwang | G02B 6/0038 349/65 |
| 2009/0167987 A1* | 7/2009 | Kim | G02B 6/0038 349/65 |
| 2010/0014316 A1* | 1/2010 | Yue | G02B 6/0036 362/619 |
| 2010/0141870 A1* | 6/2010 | Choe | G02B 6/0055 349/65 |
| 2012/0113680 A1* | 5/2012 | Nakai | G02B 6/0011 362/611 |
| 2019/0121014 A1* | 4/2019 | Huang | G02B 6/0088 |

FOREIGN PATENT DOCUMENTS

| TW | 201124778 A1 | 7/2011 |
| TW | 201232115 A1 | 8/2012 |

* cited by examiner

*Primary Examiner* — Andrew J Coughlin
*Assistant Examiner* — Jessica M Apenteng

(57) ABSTRACT

A light guide plate includes a light incident surface and a bottom surface arranged adjacently. The bottom surface is provided with a plurality of first columnar structures. Each of the first columnar structures extends along a first direction from a vicinity of the light incident surface and toward away from the light incident surface. An accommodating space is formed between any two adjacent first columnar structures. A side of these first columnar structures away from the bottom surface is provided with a plurality of light exit microstructures. The light guide plate has an effect of preventing scratches. A backlight module includes the light guide plate mentioned above and a light source.

20 Claims, 5 Drawing Sheets

LIGHT GUIDE PLATE AND BACKLIGHT MODULE USING THE SAME

CROSS-REFERENCE TO RELATED APPLICATION

This application claims the priority benefit of CN202021164623.X, filed on Jun. 22, 2020. The entirety of the above-mentioned patent application is hereby incorporated by reference herein and made a part of this specification.

FIELD OF THE INVENTION

The invention relates to a light guide element, and more particularly to light guide plate and a backlight module using the light guide plate.

BACKGROUND OF THE INVENTION

A liquid crystal display device includes a backlight module and a display panel, and the backlight module is used to provide a display light source to the display panel. The backlight module includes a direct-type backlight module and an edge-type backlight module. The edge-type backlight module has the advantage of being thinner because the light source is arranged at a side surface (light incident surface) of a light guide plate, which is beneficial to reduce the entire thickness of liquid crystal display device.

Generally speaking, the edge-type backlight module further includes a reflecting sheet disposed under the light guide plate, and a bottom surface of the light guide plate is in contact with the reflecting sheet and is substantially flat. It is inevitable that foreign objects, such as dust particles, will be generated during the manufacturing process of the light guide plate or the assembling process of the edge-type backlight module, and the foreign objects are likely to stay between the bottom surface of the light guide plate and the reflecting sheet. During the transportation of the liquid crystal display device or the edge-type backlight module, the above-mentioned foreign objects can easily cause scratches on the bottom surface of the light guide plate, causing the display light source provided by the edge-type backlight module to produce white spots, thereby affecting the image quality of the liquid crystal display device.

The information disclosed in this "BACKGROUND OF THE INVENTION" section is only for enhancement understanding of the background of the described technology and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light guide plate to avoid being scratched by foreign objects.

The invention also provides a backlight module to provide a planar source with better quality.

Other advantages and objects of the invention may be further illustrated by the technical features broadly embodied and described as follows.

In order to achieve one or a portion of or all of the objects or other objects, a light guide plate provided by an embodiment of the invention has a light incident surface and a bottom surface arranged adjacently. The bottom surface is provided with a plurality of first columnar structures. Each of the first columnar structures extends along a first direction from near the light incident surface and toward away from the light incident surface. An accommodating space is formed between any two adjacent first columnar structures in these first columnar structures. A side of these first columnar structures away from the bottom surface is provided with a plurality of light exit microstructures.

In order to achieve one or a portion of or all of the objects or other objects, another embodiment of the invention provides a backlight module includes the aforementioned light guide plate and a light source. The light source is disposed beside the light incident surface.

In the light guide plate of the embodiment of the invention, since the bottom surface is provided with the plurality of first columnar structures, a plurality of accommodating spaces are formed between these first columnar structures. The accommodating spaces can be served as passages, and is suitable for the foreign objects to flow and roll away from the light guide plate, so that the situation that the foreign objects stay on and scratch the light guide plate can be avoided. Since the backlight module of the embodiment of the invention uses the above-mentioned light guide plate, the situation that the planar light source has white spots due to the scratch on the light guide plate by the foreign objects can be avoided, thereby providing a planar light source with better quality.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
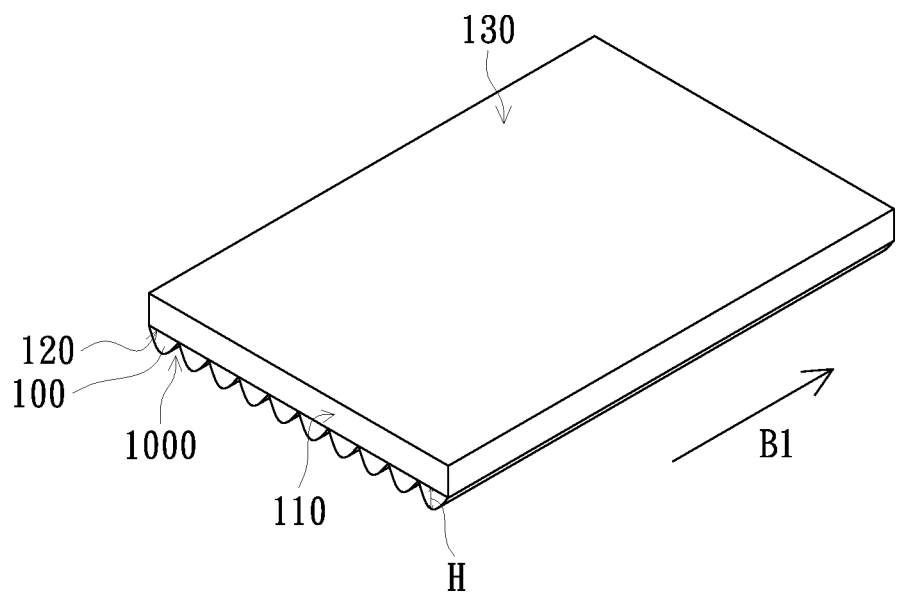
FIG. 1 is a three-dimensional schematic view of a light guide plate in accordance with an embodiment of the invention.

FIG. 1 shows a three-dimensional schematic view of a light guide plate in accordance with an embodiment of the invention. As shown in FIG. 1, the light guide plate 10 has a light incident surface 110 and a bottom surface 120 arranged adjacently, and the bottom surface 120 is provide with a plurality of first columnar structures 100. The material of the light guide plate 10 can be, for example, polycarbonate (PC), poly (methyl methacylate) (PMMA), but the invention does not limit the material of the light guide plate 10. Each of the first columnar structures 100 extends along a first direction B1 from near the light incident surface 110 and toward away from the light incident surface 110, and the first columnar structures 100 are parallel to each other. In the embodiment of the invention, the first direction B1 is, for example, perpendicular to the light incident surface 100, but is not limited thereto.

The first columnar structure 100 of the embodiment is, for example, semi-cylindrical structure, but may also be triangular structure, tapered structure, or the like. The invention does not limit the specific shapes of the first columnar structure 100. Additionally, the first columnar structure 100 has a height H relative to the bottom surface 120, the height H can be between 3 μm and 30 μm; preferably, between 5 μm and 15 μm. An accommodating space 1000 is formed between any two adjacent first columnar structures 100. The accommodating spaces 1000, for example, extend along the first direction B1. The accommodating spaces 1000 can accommodate foreign objects, such as dust particles. The accommodating spaces 1000 can also be used as passages, so that the foreign objects are allowed to flow through the accommodating space 1000 and leave the light guide plate 10. Thus, the first columnar structures 100 and the accommodating spaces 1000 formed by the same facilitates avoiding the foreign objects from remaining on the bottom surface 120 and scratching the light guide plate 10, so that the situation that the planar light source emitting from the light exit surface 130 of the light guide plate 10 has a white spot is prevented, wherein the light exit surface 130 and the bottom surface 120 are disposed opposite to each other, and the light incident surface 110 is connected between the light exit surface 130 and the bottom surface 120.

Figure 2:
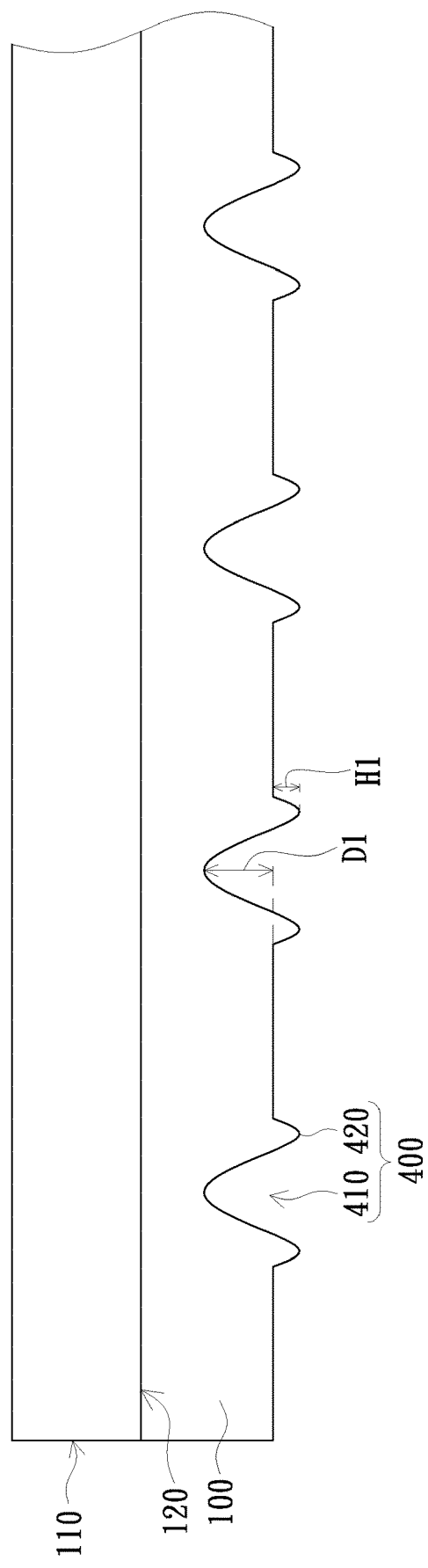
FIG. 2 is a partial cross-sectional schematic view along a first direction B1 of FIG. 1.

FIG. 2 is a partial cross-sectional schematic view along the first direction of FIG. 1. As shown in FIGS. 1 and 2, the light guide plate 10 is provided with a plurality of light exit microstructures 400 at a side of the first columnar structures 100 away from the bottom surface 120 to destroy the total reflection of light in the light guide plate 10, so that the light can be emitted from the light exit surface 130.

The light exit microstructures 400 can be arranged regularly at the first columnar structures 100, or can be distributed irregularly. The density of the light exit microstructures 400 can be the same, or can be variable. In the embodiment of the invention, each of the first columnar structures 100 is provided with a plurality of light exit microstructures 400, and the distance between adjacent light exit microstructures 400 on the same first columnar structure 100 is approximately the same, but is not limited thereto. For example, as the distances from the light incident surface 110 is farther, the distances between adjacent light exit microstructures 400 may gradually become smaller, so as to present unequal densities. In another embodiment, the distribution patterns of the light exit microstructures 400 on these first columnar structures 100 are independent, and the numbers of the light exit microstructures 400 on each first columnar structure 100 can also be different.

In the embodiment, each light exit microstructure 400 includes, for example, a concave portion 410 and a convex portion 420, and the convex portion 420 is located at a periphery of the concave portion 410 approximately. Particularly, the convex portion 420 can completely surround or partially surround the periphery of the concave portion 410. The concave portion 410 has a depth D1, the convex portion has a height H1, and the depth D1 is larger than the height H1. In the embodiment of the invention, the depth D1 is, for example, less than or equal to 10 μm, and preferably, between 3 μm and 5 μm. The height H1 is between 0.3 μm and 2 μm. In one embodiment, a hot rolling process can be applied to form the concave portion 410, and the convex portion 420 is formed at the periphery of the concave portion 140 due to the material extrusion in the hot rolling process. However, the invention does not limit the formation method of the light exit microstructures 400. Additionally, the light exit microstructures 400 mentioned above can also be replaced with other microstructures having a function of destroying total reflection; the invention does not limit the species of the light exit microstructures 400.

In the embodiment, the light exit microstructures 400 has the convex portion 420, so the light guide plate 10 contacts with a reflecting sheet by the convex portion 420 when the light guide plate 10 is disposed on the reflecting sheet (not shown). In this way, the wet-out phenomenon between the light guide plate 10 and the reflecting sheet is avoided, so as to improve quality of the planar light source emitted from the light exit surface 130. In other embodiment, if the light exit microstructures does not have the convex portion mentioned above, the first columnar structures 100 disposed at the bottom surface 120 of the light guide plate 10 can also prevent the light guide plate 10 from contacting the reflecting sheet on its entire surface, so as to achieve the function of avoiding the wet-out phenomenon mentioned above.

Figure 3:
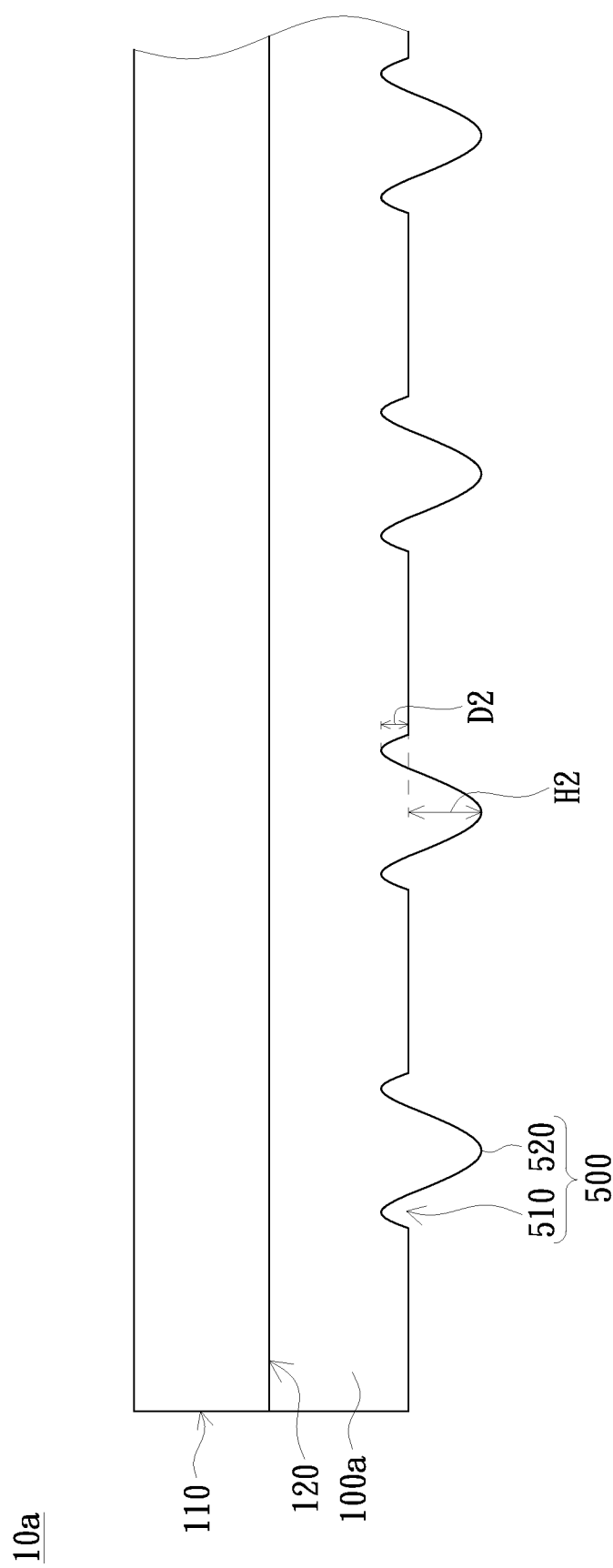
FIG. 3 is a partial cross-sectional schematic view of a light guide plate in accordance with another embodiment of the invention.

FIG. 3 shows a partial cross-sectional schematic view of a light guide plate in accordance with another embodiment of the invention. As shown in FIG. 3, the light guide plate 10a of the embodiment is similar to the light guide plate 10 mentioned above, the main difference lies in the different light exit microstructures. Particularly, each light exit microstructure 500 of the first columnar structures 100a of the light guide plate 10a includes a concave portion 510 and a convex portion 520, and the concave portion 510 is located at a periphery of the convex portion 520. In particularly, the concave portion 510 can completely surround or partial surround the periphery of the convex portion 520. Additionally, the concave portion 510 has a depth D2, the convex has a height H2, and the depth D2 is less than the height H2. In the embodiment of the invention, the height H2 is, for example, 10 μm; and preferably, between 3 μm and 5 μm. In one embodiment, a hot rolling process can be applied to form the convex portion 520, and the concave portion 510 is formed at the periphery of the convex portion 520 due to the material extrusion in the hot rolling process. However, the invention does not limit the formation method of the light exit microstructures 500.

Figure 4:
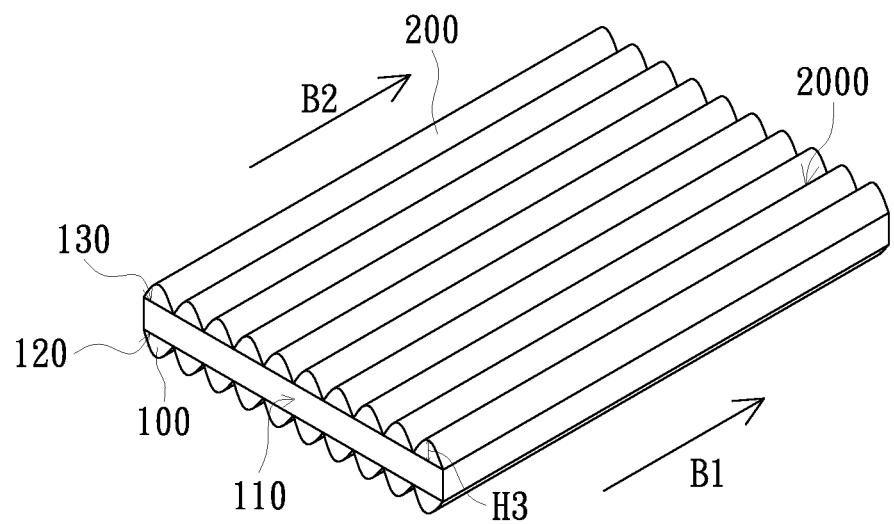
FIG. 4 is a three-dimensional schematic view of a light guide plate in accordance with still another embodiment of the invention.

FIG. 4 shows a three-dimensional schematic view of a light guide plate in accordance with still another embodiment of the invention. As shown in FIG. 4, the light guide plate 10b of the embodiment is similar to the light guide plate 10 of FIG. 1, and the main difference lies in that the light exit surface 130 of the light guide plate 10b of the embodiment is provided with a plurality of second columnar structures 200. Each second columnar structure 200 has, for example, a height H3, and extends along a second direction B2 from near the light incident surface 110 and toward away from the light incident surface 110. The range of the height H3 can be as described in the first columnar structures 100 above. The heights of the first columnar structures 100 can be the same as or different from the heights of the second columnar structures 200. In the embodiment of the invention, the second direction B2 is, for example, perpendicular to the light incident surface 100 and the same as the first direction B1, but is not limited thereto. The second direction B2 and the first direction B1 can be different; in this way, the included angle between the second direction B2 and the first direction B1 is preferably between −20° and 20°.

As shown in FIG. 4, an accommodating space 2000 is formed between any two adjacent second columnar structures 200. The accommodating spaces 2000 are, for example, extend along the second direction B2. The accommodating spaces 2000 can accommodate foreign objects. The accommodating spaces 2000 can also be used as passages, so that the foreign objects are allowed to flow through the accommodating spaces 2000 and leave the light guide plate 10b. Thus, the second columnar structures 200 and the accommodating spaces 2000 formed by the same facilitate avoiding the foreign objects from remaining on the light exit surface 130 and scratching the light guide plate 10b, so that the situation that the planar light source emitting from the light guide plate 10b has a white spot is prevented. Additionally, other optical films may be disposed above the light guide plate 10b, and the second columnar structures 200 disposed at the light exit surface 130 of the light guide plate 10b can prevent the light exit surface 130 of the light guide plate 10b from contacting the optical films on its entire surface, so as to achieve the function of avoiding the wet-out phenomenon.

In the embodiment of the invention, the first columnar structures 100 and the second columnar structures 200 are semi-cylindrical structures, and are oppositely disposed at the bottom surface 120 and the light exit surface 130, but are not limited thereto. The first columnar structures 100 and the second columnar structures 200 can also be different structures. The number of the first columnar structures 100 and the number of the second columnar structures 200 are not limited to be equal. In another embodiment, the number of the first columnar structures 100 on the bottom surface 120 and the number of the second columnar structures 200 on the light exit surface 200 are different.

Figure 5:
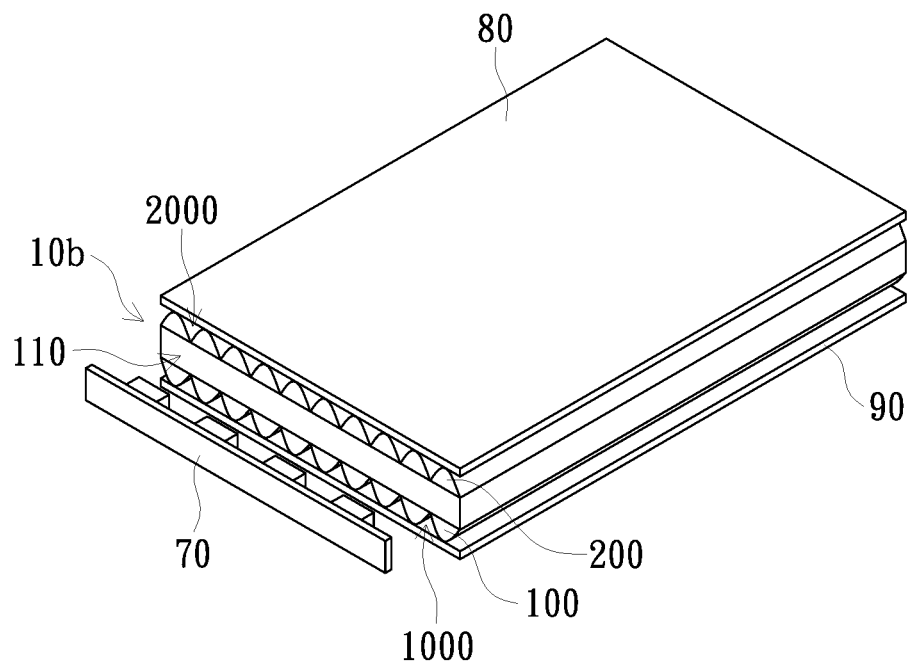
FIG. 5 is a three-dimensional schematic view of a backlight module in accordance with an embodiment of the invention.

FIG. 5 is a three-dimensional schematic view of a backlight module in accordance with an embodiment of the invention. As shown in FIG. 5, the backlight module 1 includes the light guide plate 10b and a light source 70. The light source 70 is disposed beside the light incident surface 110 of the light guide plate 10b. The embodiment is illustrated by the light guide plate 10b. It can be understood that the light guide plate 10b of the backlight module 1 can also be replaced by the light guide plate 10 or 10a of other embodiments mentioned above.

The backlight module 1 of the embodiment of the invention may further include an optical film 80 and/or a reflecting sheet 90. The optical film 80 can be any film or combination thereof that can improve the light utilization rate, homogenize the planar light source, or adjust the light output angle; the film can be brightness enhancement film, diffusing sheet, and the like. As shown in FIG. 5, the optical film is disposed on the second columnar structures 200, and the first columnar structures 100 are supported against the reflecting sheet 90.

Since the light guide plate 10b has the first columnar structures 100, the wet-out phenomenon between the light guide plate 10b and the reflecting sheet 90 is avoided; besides, the second columnar structures 200 can also prevent the wet-out phenomenon between the light guide plate 10b and the optical film 80, so as to help to ensure the quality of the planar light source provided by the backlight module 1 and improve the image quality of display devices. Additionally, since the accommodating spaces 1000 are formed between the first columnar structures 100, the accommodating space 2000 are formed between the second columnar structures 200, and the accommodating spaces 1000, 2000 can accommodate foreign objects and the foreign objects are allowed to flow through the accommodating spaces 1000, 2000 and leave the light guide plate 10b, so as to reduce the chance of foreign matters scratching the light guide plate 10b, thereby improving the quality of the display light source provided by the backlight module 1.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first columnar structure and the second columnar structure are only used for distinguishing various elements and do not limit the number of the elements.

What is claimed is:

1. A light guide plate, comprising:
a light incident surface and a bottom surface arranged adjacently, wherein the bottom surface is provided with a plurality of first columnar structures, each of the first columnar structures extends along a first direction from near the light incident surface and away from the light incident surface, an accommodating space is formed between any two adjacent first columnar structures in the plurality of first columnar structures, and an apex of the plurality of first columnar structures away from the bottom surface is provided with a plurality of light exit microstructures,
wherein each of the plurality of light exit microstructures comprises a concave portion and a convex portion, and one of the concave portion and the convex portion is at least partially surround a periphery of the other one of the concave portion and the convex portion, wherein one part of the one of the concave portion and the convex portion and the other part of the one of the concave portion and the convex portion are arranged opposite to a center axis of the other one of the concave portion and the convex portion.

2. The light guide plate according to claim 1, wherein the convex portion is located at a periphery of the concave portion, and a depth of the concave portion is larger than a height of the convex portion.

3. The light guide plate according to claim 2, wherein the depth of the concave portion is less than or equal to 10 μm, and the height of the convex portion is between 0.3 μm to 2 μm.

4. The light guide plate according to claim 1, wherein the concave portion is located at a periphery of the convex portion, and a depth of the concave portion is less than a height of the convex portion.

5. The light guide plate according to claim 4, wherein the height of the convex portion is less than or equal to 10 μm.

6. The light guide plate according to claim 1, wherein the plurality of first columnar structures comprises a semi-cylindrical columnar structure or a triangular columnar structure.

7. The light guide plate according to claim 1, wherein the light guide plate further comprises a light exit surface opposite to the bottom surface, the light incident surface is connected between the light exit surface and the bottom surface, the light exit surface is provided with a plurality of second columnar structures, and each of the plurality of second columnar structures extends along a second direction from near the light incident surface and away from the light incident surface.

8. The light guide plate according to claim 7, wherein an included angle between the first direction and the second direction is between −20° and 20°.

9. The light guide plate according to claim 7, wherein a number of the plurality of first columnar structures is the same as or different from a number of the plurality of second columnar structures.

10. A backlight module, comprising:
a light guide plate and a light source, wherein:
the light guide plate comprises a light incident surface and a bottom surface arranged adjacently, the bottom surface is provided with a plurality of first columnar structures, each of the first columnar structures extends along a first direction from a vicinity of the light incident surface and away from the light incident surface, an accommodating space is formed between any two adjacent first columnar structures in the plurality of first columnar structures, and an apex of the plurality of first columnar structures away from the bottom surface is provided with a plurality of light exit microstructures; and
the light source is disposed beside the light incident surface,
wherein each of the plurality of light exit microstructures comprises a concave portion and a convex portion, and one of the concave portion and the convex portion is at least partially surround a periphery of the other one of the concave portion and the convex portion, wherein one part of the one of the concave portion and the convex portion and the other part of the one of the concave portion and the convex portion are arranged opposite to a center axis of the other one of the concave portion and the convex portion.

11. The backlight module according to claim 10, wherein the convex portion is located at a periphery of the concave portion, and a depth of the concave portion is larger than a height of the convex portion.

12. The backlight module according to claim 11, wherein the depth of the concave portion is less than or equal to 10 μm, and the height of the convex portion is between 0.3 μm to 2 μm.

13. The backlight module according to claim 10, wherein the convex portion is located at a periphery of the concave portion, and a depth of the concave portion is less than a height of the convex portion.

14. The backlight module according to claim 13, wherein the height of the convex portion is between 0.3 μm to 2 μm.

15. The backlight module according to claim 10, wherein the plurality of first columnar structures comprises a semi-cylindrical columnar structure or a triangular columnar structure.

16. The backlight module according to claim 10, wherein the light guide plate further comprises a light exit surface opposite to the bottom surface, the light incident surface is connected between the light exit surface and the bottom surface, the light exit surface is provided with a plurality of second columnar structures, and each of the plurality of second columnar structures extends along a second direction from the vicinity of the light incident surface and away from the light incident surface.

17. The backlight module according to claim 16, wherein an included angle between the first direction and the second direction is between −20° and 20°.

18. The backlight module according to claim 16, wherein a number of the plurality of first columnar structures is the same as or different from a number of the plurality of second columnar structures.

19. The backlight module according to claim 16, wherein the backlight module further comprises an optical film disposed on the plurality of second columnar structures.

20. The backlight module according to claim 10, wherein the backlight module further comprises a reflecting sheet, and the plurality of first columnar structures are supported against the reflecting sheet.

* * * * *